United States Patent [19]

Kaiser

[11] 4,030,901

[45] June 21, 1977

[54] METHOD FOR DRAWING FIBERS

[75] Inventor: Peter Kaiser, Middletown, N.J.

[73] Assignee: Bell Telephone Laboratories, Incorporated, Murray Hill, N.J.

[22] Filed: July 19, 1976

[21] Appl. No.: 706,927

[52] U.S. Cl. .................................. 65/2; 65/13; 65/32; 65/157; 264/85; 425/66

[51] Int. Cl.² .................................. C03B 37/02

[58] Field of Search ............ 65/157, 2, 13, 32; 425/66; 264/85

[56] References Cited

UNITED STATES PATENTS

| 3,212,871 | 10/1965 | Vatteradt | 65/157 |
| 3,717,450 | 2/1973 | Loughridge et al. | 65/157 X |
| 3,890,127 | 6/1975 | Siegmund | 65/13 X |

FOREIGN PATENTS OR APPLICATIONS 765,632  1/1957  United Kingdom .................. 65/13

Primary Examiner—Robert L. Lindsay, Jr.
Attorney, Agent, or Firm—A. A. Tirva

[57] ABSTRACT

A method for drawing silica fibers utilizing an electrical resistance furnace includes the steps of heating a preform so that it begins to flow forming a fiber; pulling the fiber from the furnace; and flushing the preform and the fiber within the furnace with counteracting inert gas flows, the gas flows protecting the preform and the fiber from contamination.

Apparatus used with the above-described method is also disclosed.

1 Claim, 2 Drawing Figures

METHOD FOR DRAWING FIBERS

BACKGROUND OF THE INVENTION

This invention relates to electrical resistance furnaces and particulary to a resistance furnace utilizing counteracting gas flows and a method for drawing fibers utilizing such a furnace.

A prior art method for drawing of silica fibers utilizing an electrical resistance furnace includes the use of a thin ceramic muffle tube to protect heater elements, usually graphite elements or tungsten wires, within the furnace from exposure to atmospheric oxygen and to enable a silica preform and a fiber drawn from the preform to be heated in an atmospheric environment within the muffle tube. The muffle tube is expensive and requires expensive controls and alarms to prevent it from being exposed to rapid temperature variations which tend to crack and break the tube. To prevent the tube from cracking, each furnace start-up and shutdown operation takes at least two to three hours. An alternative to cooling the furnace down to room temperature between production runs is to keep the furnace at some elevated temperature, which results in consumption of electric power.

Furthermore, as high furnace temperatures contaminants evaporate from the muffle tube, heater elements and a heat resistant metal shield lining the furnace. Most of the contaminants evaporated by the heater elements and the metal shield diffuse through the muffle tube. A great portion of these contaminants along with contaminants evaporated from the muffle tube are carried away by convectional air currents within the muffle tube, however, some contaminants condense on the preform and the fiber, contaminating both. Introduction of a forced flow of air or gas into the muffle tube, to aid the convectional air currents in the flushing out of contaminants, causes temperature gradients in the tube material. The gradients eventually cause the tube to crack. Thus, it is expensive, time consuming and difficult to draw uncontaminated fibers with a furnace wherein the resistance elements of the heater are protected from oxidation by a muffle tube.

Therefore, it is an object to provide a method for drawing of silica fibers in an electrical resistance furnace without a muffle tube.

Another object is to provide a low cost method for drawing silica fibers in an electrical resistance furnace.

Yet another object is to provide an electrical resistance furnace without an expensive control and alarm system.

These and other objects are realized in an illustrative method for drawing fibers which method has the following steps. First, the preform is heated in a furnace so that the preform begins to flow forming a fiber. Second, the fiber is pulled from the furnace; and third, the fiber and the preform are flushed by counteracting inert gas flows protecting the preform and the fiber from contamination.

A feature of the invention is the flushing of the preform and the fiber within the furnace with counteracting gas flows, the gas flows protecting the preform and the fiber from contamination.

Another feature of the invention is the injection of gas from opposite ends of the furnace into the chamber and exhaustion of the gas from the chamber through an exhaust located near a heater.

Yet another feature of the invention is the application by the counteracting gas flows of an inert gas.

BRIEF DESCRIPTION OF THE DRAWING

A better understanding of the invention may be derived from the Detailed Description as that description is considered with respect to the attached drawings in which.

DETAILED DESCRIPTION

Figure 1:
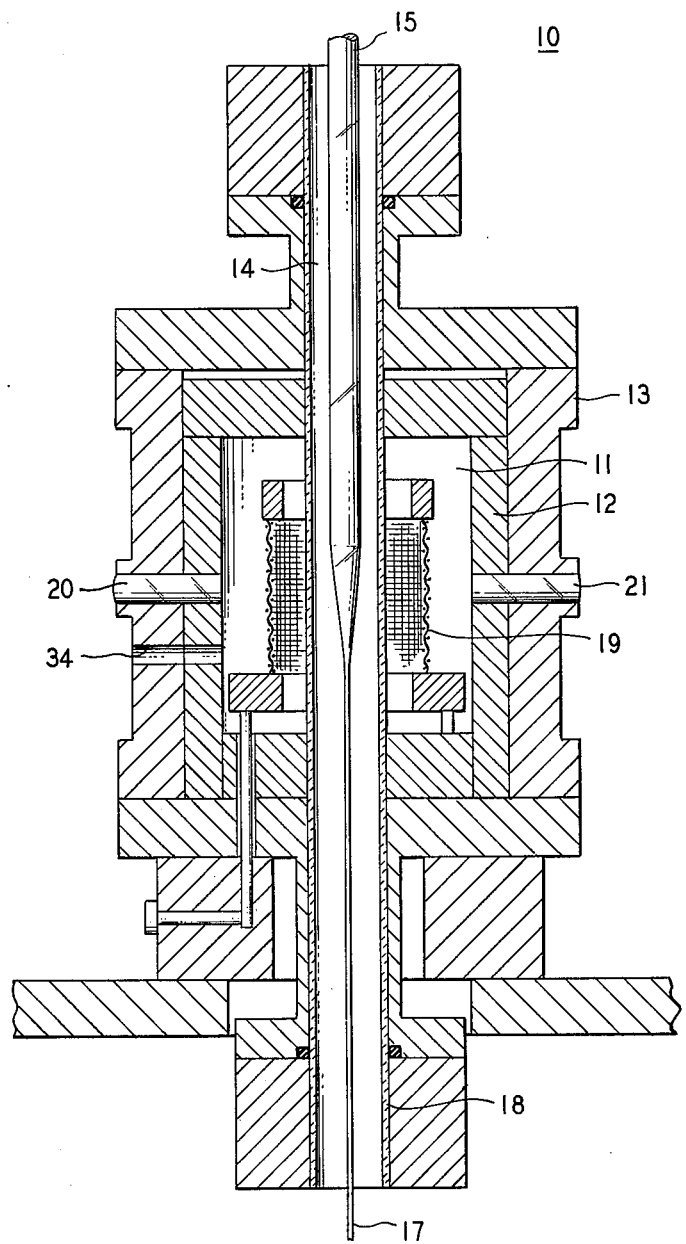
FIG. 1 shows a cross-sectional view of a prior art, electrical resistance furnace for drawing of silica fibers.

In FIG. 1 there is shown the cross section of a commercially available cylindrical, electrical resistance furnace 10 for drawing of silica fibers. The furnace 10 has a chamber 11 which is surrounded by a heat resistant molybdenum lining 12 and a water cooled outer casing 13. The furnace 10 further has a port 20 which permits access for temperature and control equipment probes (not shown), a port 21 which permits visual observation of the chamber 11 and a port 34 for filling the chamber 11 with an inert gas.

The chamber 11 contains a cylindrical, tungsten mesh heater 19. The size of the tungstem wires of the heater 19 and their number are such that when the heater 19 is connected to a properly sized electrical power source (not shown), the heater generates sufficient heat to elevate the chamber 11 temperature to 2200° C and above.

The heater 19 surrounds a portion of a cylindrical, ceramic muffle tube 18, which extends the length of the furnace 10 sealing off chamber 11 from the atmospheric air. This enables chamber 11 to be filled with inert gas, usually argon, through the port 34. A sufficient amount of gas is put into the chamber 11 to create therein a positive pressure. The inert gas keeps atmospheric air out of chamber 11 and thus prevents oxidation of the tungsten wires of the heater 19 and of the molybdenum lining 12.

The construction of the muffle tube 18 is such that it permits heat transfer between the chamber 11 and a space 14 enclosed by the muffle tube 18, which space contains a preform 15 and a fiber 17. Contaminants released at high temperatures from the molybdenum lining 12 and the tungsten wires of heater 19 diffuse through the walls of tube 18 and together with contaminants evaporating from the muffle tube 18 enter the space 14 enclosed by the muffle tube. A portion of these contaminants is flushed out of the space 14 by convectional air currents circulating within the tube 18. The remainder, however, condenses upon the preform 15 and the fiber 17 contaminating both.

To draw the fiber 17 from the silica preform 15 utilizing the above described electrical resistance furnace 10, one end of the preform 15 is inserted into the muffle tube 18 until the end reached the area of the muffle tube surrounded by the heater 19. The end of the preform 15 is then heated to approximately 2200° C at which temperature the end of the preform softens and begins to flow by gravity forming the fiber 17. Once the fiber 17 emerges from the furnace 10 it usually is wound upon a motor-driven spool (not shown).

Figure 2:
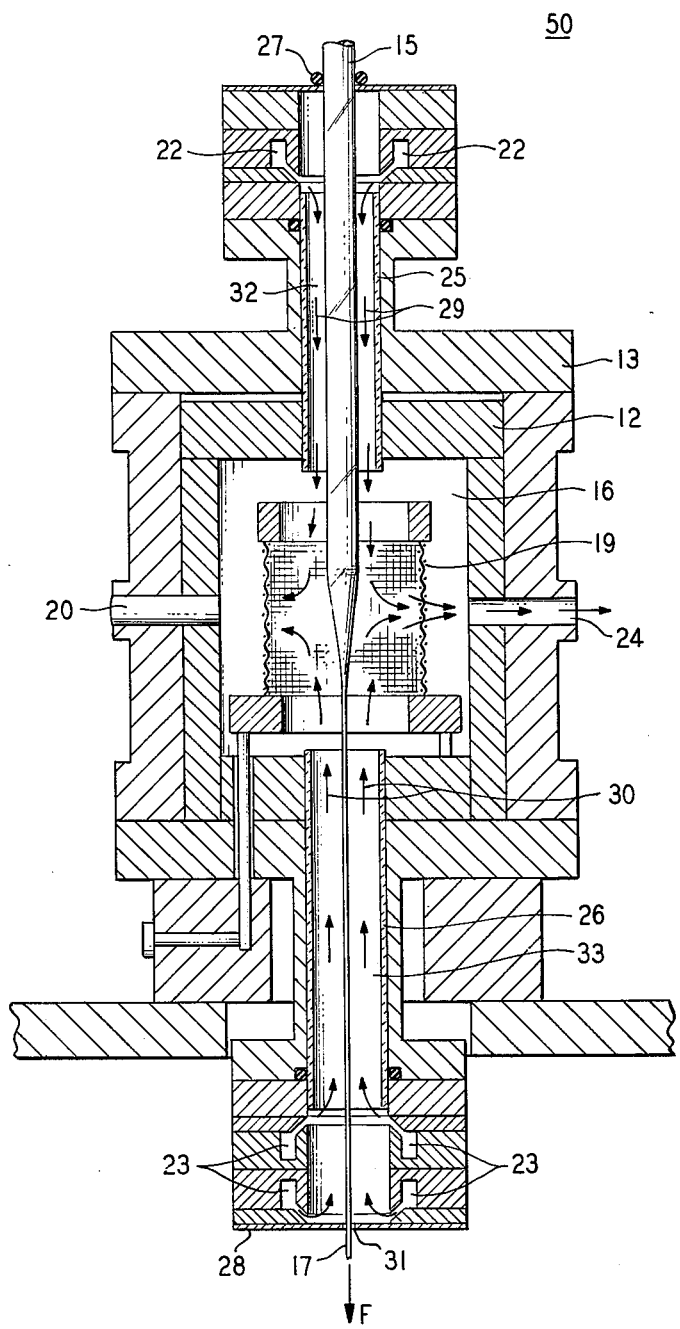
FIG. 2 shows a cross-sectional view of a furnace arranged in accordance with the present invention.

In FIG. 2 there is shown a furnace 50 which is similar to the furnace 10 of FIG. 1 but has been modified in accordance with the present invention to operate without the muffle tube 18 (shown in FIG. 1), thus eliminating the problems associated with the use of a muffle tube. The same numbers are used to identify items shown both in FIGS. 1 and 2.

The improvement of the furnace 10 consists of the creation of a chamber 16 by the removal of the muffle tube 18, addition of gas injection ports 22 and 23 and modification of the viewing port 21 (shown in FIG. 1) to act as a gas exhaust port 24. A first opening 32 into the chamber 16 is lined with a quartz tube 25 which protects the preform 15 from contamination in its passage through the molybdenum lining 12. Additionally, the quartz tube 25 guides a gas, injected at ports 22, towards a heating zone surrounded by the heater 19. A second opening 33 into the chamber 16 is lined with a quartz tube 26 which protects the fiber 17 from contaminants in its passage through the molybdenum lining 12. Additionally, the quartz tube 26 guides a gas, injected at ports 23, towards the heating zone surrounded by the heater 19.

One end of the preform 15 is inserted at a constant rate through the opening 32 into the chamber 16 where the preform is surrounded by the electric heater 19. The heater 19 preferably has a tungsten mesh element such as shown in U.S. Pat. No. 3,178,665. The heater 19 has to be able to heat the preform to a temperature of approximately 2200° C at which the silica preform 15 softens and begins to flow by gravity forming a fiber 17. A combination of an insertion rate of ¼ cm³/min for the preform 15 with a power input of 6.5 KW to the heater 19 produces a fiber 17 of acceptable strength (100,000 to 500,000 psi). Decreasing the insertion rate increases the fiber strength, and increasing the insertion rate decreases the fiber strength.

Once the preform 15 is at the temperature at which it begins to flow by gravity forming the fiber 17, the end of the fiber 17 emerging from the furnace 50 is taken up on a motor driven spool (not shown) which then pulls the fiber 17 from the furnace. The spool is 10 inches in diameter and is driven by a variable speed electric motor capable of driving the spool from 20 to 150 rpm. For a specific insertion rate of preform 15 into the furnace, the diameter of the fiber 17 is determined by varying the rotational speed of the spool. Increasing this rotational speed decreases the fiber diameter, and decreasing the rotational speed increases the diameter.

To protect the preform 15 and the fiber 17 from contaminants which are evaporated at high temperatures from the tungsten heater 19 and the molybdenum heat resistant lining 12, the preform 15 and fiber 17 are flushed by counteracting flows 29 and 30 of an uncontaminated inert gas. An inert gas is one that does not chemically react with furnace elements at any furnace operating temperature. One of the many commercially available inert gases that could be used in argon.

Flushing of the preform 15 within the furnace 50 is accomplished by injecting the gas, which makes up flow 29, through ports 22 located near one end of the furnace 50 through which the preform 15 is inserted. The injected gas flows into the chamber 16 flushing the preform 15 and the heater 19.

Flushing of the fiber 17 within the furnace 50 is accomplished by injecting the gas, which makes up flow 30, through ports 23 located near the opposite end of the furnace where the fiber 17 leaves the furnace. The injected gas flows into the chamber 16 flushing the fiber 17 and the heater 19.

Flows 29 and 30 meet within the chamber 16 in the region surrounded by the heater 19. When the opposing flows 29 and 30 meet, the result is a combined flow away from the preform 15 and the fiber 17 and towards the walls of the chamber 16. The combined flow is exhausted from the chamber 16 through an exhaust port 24. Contamination of the preform 15 and the fiber 17 is kept to a minimum by flushing the preform and fiber with flows of uncontaminated inert gas. Contaminated gas, in the heater region, is immediately exhausted without coming into direct contact with the preform or fiber.

Because openings into the furnace 50 are sealed (aside from exhaust port 24) and inert gas from flows 29 and 30 enter under pressure, a slight positive pressure is created with the chamber 16 and openings 32 and 33. Thus, atmospheric air is kept out of the chamber 16 and the tungsten wires of heater 19 are protected from oxidation. The sealing of the furnace 50 is accomplished by inserting the silica preform 15 through a silica rubber ring 27 and by closing off the end of the furnace through which the fiber 17 exits with a plate 28 having an adjustable opening 31 which allows the fiber 17 to exit from the furnace. Gas under pressure in chamber 16 is exhausted to the atmospheric pressure outside of port 24. The gas is exhausted directly to the atmosphere or is directed to an apparatus which purges the gas from contaminants so that the gas can be reused within the furnace.

Through experimentation it was determined that a minimum flow of 3 liters per minute was required for flow 29 and a minimum flow rate of 1.5 liters per minute was required for flow 30 in order to produce sufficient flushing action to keep the fiber and the preform substantially free from contamination. The higher flow rate for flow 29 was required to counteract convectional gas currents which oppose flow 29. The convectional gas currents are caused by the high temperature within the furnace and aid flow 30. Because electrical resistance furnaces come in different configurations and sizes, the mentioned minimum flow rates may have to be increased or decreased. In any case, one should strive for a minimum flow rate at which the fiber and the preform remain in a substantially uncontaminated state, the minimum flow rate being desirable to minimize the consumption of an inert gas.

It is to be understood that the above-described arrangements are illustrative of the application of the principles of the invention. As various changes could be made in the above-disclosed apparatus and method without departing from the scope of the invention, it is intended that all matter contained in the above description or shown in the accompanying drawing, shall be interpreted as illustrative and not in a limiting sense.

What is claimed is:

1. A method for drawing fibers comprising the steps:
heating a preform in a furnace so that the preform begins to flow forming a fiber,
pulling the fiber from the furnace, and
flushing the preform, the fiber and a heater within a chamber located in the furnace with counteracting inert gas flows, by injecting the gas from ports located at opposite ends of the furnace into the chamber and exhausting the gas from the chamber through a port located near the heater within the chamber, the gas flows protecting the preform and the fiber from contamination.

* * * * *